United States Patent [19]
Smith

[11] Patent Number: 5,329,283
[45] Date of Patent: Jul. 12, 1994

[54] SYNTHETIC APERTURE RADAR DIGITAL SIGNAL PROCESSOR

[75] Inventor: John E. Smith, Ann Arbor, Mich.

[73] Assignee: Environmental Research Institute of Michigan, Ann Arbor, Mich.

[21] Appl. No.: 53,195

[22] Filed: Apr. 28, 1993

[51] Int. Cl.$^5$ ............................................. G06F 7/38
[52] U.S. Cl. .................................... 342/25; 342/194; 364/736
[58] Field of Search ...................... 364/748, 726, 736; 342/25, 194

[56] References Cited

U.S. PATENT DOCUMENTS 4,718,018  1/1988  Sloane et al. .................. 364/480
4,872,012 10/1989  Chabries ......................... 342/25
4,996,661  2/1991  Cox et al. ........................ 364/748

OTHER PUBLICATIONS

Military–Standard Products UT69532 IQMAC Applications Handbook, United Technologies Microelectronics Center, Aug. 1989.

Primary Examiner—Mark Hellner
Attorney, Agent, or Firm—Krass & Young

[57] ABSTRACT

A digital signal processor optimized for synthetic aperture radar image formation provides two separate stages of arithmetic processing along independent in-phase and quadrature channels. The first stage accepts a first reference input and integrates a multiplier/accumulator for each channel, and the second stage accepts a second reference input and includes a multiplier and an adder for each channel. In addition to hardware to select and route data in accordance with a desired operation, a hold register is incorporated prior to input-selection logic to facilitate complex-by-complex multiplications of data derived from either input in the first stage. Hold registers are also included before the second-stage adders to permit a complex multiplication with magnitude weighting to occur during the zero-th stage of a fast Fourier transformation, effectively hiding the time to perform one FFT stage. A control section contains a microprogrammed control sequencer, an input/output controller, data address generators and two reference address generators, the data and address generators being implemented using digital differential analyzers, or DDAs, which may be combined to form second-order or groups of complex linear DDAs. Implemented as a single-chip C-MOS integrated circuit, the architecture comprises a complete SAR image-formation processing element, including all arithmetic, control and addressing functions. The circuit is entirely self-contained with the exception of an external memory required to store partial results and reference functions.

12 Claims, 7 Drawing Sheets

SYNTHETIC APERTURE RADAR DIGITAL SIGNAL PROCESSOR

FIELD OF THE INVENTION

This invention relates generally to digital signal processors and, in particular, to a digital signal processor architecture optimized for synthetic aperture radar image formation.

BACKGROUND OF THE INVENTION

Radar signal processing can be very computationally intensive. With the transition to digital techniques in general and high-resolution image formation in particular, computational requirements can easily grow to many millions of arithmetic operations. Indeed, such computational demands are limited only by the resolution required and, as might be expected, the desire to extract finer details is ever increasing.

To enhance cross-range resolution, that is, the ability to distinguish between two points next to each other at nearly the same distance from the radar receiver, a larger antenna can be used, but such an approach quickly becomes unwieldy for certain applications. For example, to observe meaningful details on the earth's surface from a relatively high altitude at non-exotic radar frequencies, an antenna kilometers in length might be required.

It was discovered that cross-range resolution could be enhanced by integrating multiple signals from a single target using a moving antenna (see U.S. Pat. No. 3,196,436), a technique now commonly referred to as synthetic aperture radar, or SAR. With SAR, a small antenna aboard an aircraft or spacecraft can be used to collect geographic data, often by side-looking, and a high resolution can be achieved independent of sensor altitude by synthesizing an extremely long antenna aperture using a signal processor.

The advantages of SAR are many, but it is not a technique that simplifies, as the reduction in physical antenna size results in a corresponding increase in computational intensity. To resolve and correct SAR data requires signal processing and analysis above and beyond the inherently complex operations associated with real-aperture digital radar. Like other high-resolution radar systems, SAR is coherent, in that it must retain both magnitude and phase of the backscattered echo signal. In addition, various processing techniques must be employed to sharpen the received beam, improve signal-to-noise ratio and, especially with SAR, to correct for radiometric and geometric distortions. In the digital domain, the filtering and other processes required to improve SAR image quality involve numerical operations such as Fourier transformation, correlation and convolution which, in turn, require numerous high-speed multiplications and/or additions of long data words.

Depending upon the requirements of the application, the computations required to implement various SAR algorithms may be performed on a variety of computer systems ranging from general-purpose machines, including supercomputers, to specialized array processors. However, resort to such physically large systems requires that the SAR problem be broken up, with pulse transmission and data collection being performed during flight but with the bulk of the signal processing being carried out in a separate ground station receiving the data via down-link. The need for a down-link increases equipment complexity and introduces communication problems of its own.

As such, for applications demanding processing throughputs in excess of those possible with general-purpose computer-based solutions, specialized hardware implementations have been developed to perform SAR-specific operations. Presently, however, even with such dedicated hardware, various modules are necessary to process each portion of the SAR algorithm, that is, to compute the requisite Fourier transformations, complex multiplications, and to form the modulus of the processed image. Additional hardware is typically required to implement resampling filters in each image dimension to correct for the geometric distortion.

Recently, several DSP devices have been introduced which provide more integrated solutions to the SAR processing problem. For example, an arithmetic element called the IQMAC, developed by United Technologies, implements a complex multiply-accumulate circuit which can be used as a building block in a SAR system, but the device requires substantial support circuitry in use. Similarly, a device manufactured by TRW Corp. and a two-chip set called the DaSP/PaC, originally developed by Honeywell Corporation, can perform fast Fourier transformations as well as complex and real multiplications, but these components also require additional hardware for less generic functions.

There remains, therefore, an unsatisfied need for a much more highly integrated solution, one that is dedicated to SAR signal processing and image formation. Such a device would forgo the need for unique module designs to implement each SAR processing operation and, as a consequence, dramatically increase the flexibility and performance of the overall system, decrease cost and streamline the logistical requirements of the resulting product. This will bring closer the ultimate goal of real-time image formation within a self-contained system aboard the same vehicle carrying the transmitter/receiver.

SUMMARY OF THE INVENTION

The present invention is a highly integrated DSP architecture dedicated to SAR processing and image formation. In the preferred embodiment, a complete SAR image-formation processing (IFP) element, including all arithmetic, control and addressing functions, is implemented as a single complementary-MOS integrated circuit (C-MOS IC). The circuit is self-contained with the exception of external memory required to store partial results and reference functions.

The arithmetic section of the present invention overcomes shortcomings of the prior art by providing two separate stages of processing along independent I and Q (in-phase and quadrature) channels, preferably using, though not limited to, floating-point arithmetic. The first stage accepts a first reference input and integrates a multiplier/accumulator for each channel, and the second stage accepts a second reference input and includes a multiplier and an adder for each channel, for a total of four multipliers and four adders (including the two associated with the accumulate function). The two reference inputs may also be swapped, one for the other. This configuration not only significantly increases computational throughput in SAR-related applications, it also affords simultaneous computations not possible with the prior-art devices.

Input-select logic is used to route data from the input ports and the first-stage reference-address input to the first-stage multiplier/accumulators in accordance with a control input. A multiplexer and swap registers provide considerable input flexibility by allowing any half of either 32-bit input data word, or the first 16-bit reference input, to feed either input of either multiplier/accumulator. The output of each multiplier/accumulator forms one input to one of the second-stage multipliers, the second input to each multiplier being the second reference input. The output of each second-stage multiplier forms one input to one of the second-stage adders. A second multiplexer allows either data input to be used as the second input to either adder.

The architecture further includes requisite registers and hardware to retain, zero, negate, and scale data in accordance with a desired operation. A hold register is incorporated prior to the input-selection logic, for example, to allow complex-by-complex multiplications of data derived from either input in the first stage. Hold registers are also included before the second-stage adders to permit a complex multiplication with magnitude weighting to occur during the zero-th stage of a fast Fourier transformation (FFT), effectively reducing the combined operation time by one FFT stage time.

The control section of the present invention contains a microprogrammed control sequencer, an input/output controller, data address generators and two reference address generators. The data and reference address generators are implemented using digital integrators commonly referred to as digital differential analyzers, or DDAs, which may be combined to form 2nd-order or groups of complex linear DDAs.

DETAILED DESCRIPTION OF THE PREFERRED EMBODIMENT

The detailed description of the digital signal processor will proceed as follows. First, the arithmetic section will be discussed, making reference to FIGS. 1 and 2. Next, the control section will be described, followed by a detailed discussion of the digital differential analyzer which forms a building block for the address generators. Finally, a complete arithmetic module, taking advantage of the present invention will be described in conjunction with external memory devices, and a printed-circuit-board (PCB) layout will be used to show the final physical implementation.

Figure 1:
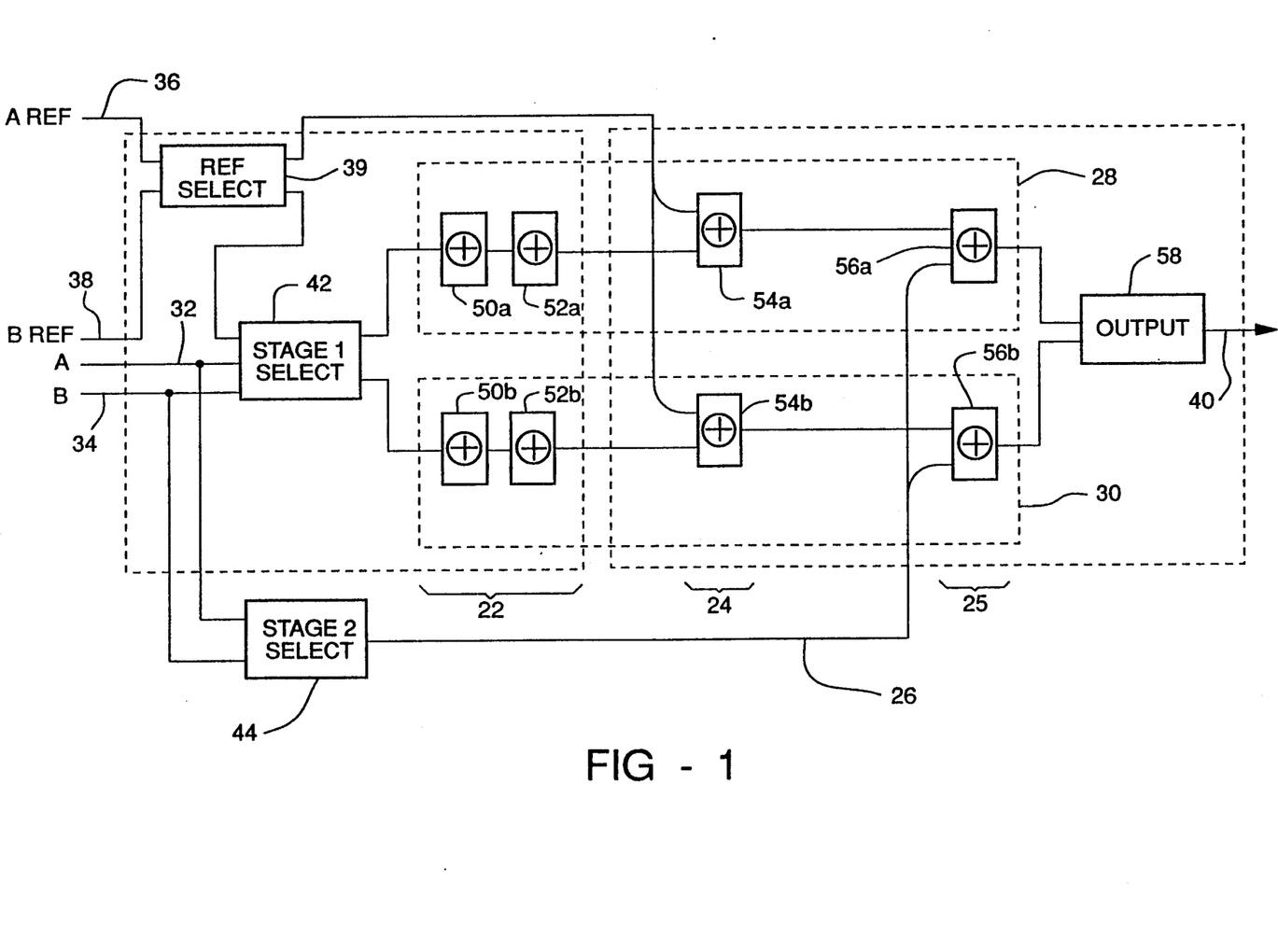
FIG. 1 is a high-level block diagram used to introduce major architectural features and data paths within the arithmetic element of the present invention.

FIG. 1 is a high-level block diagram used to introduce major architectural sections and conventions referred to in the more detailed drawings and descriptions which follow. The overall architecture of the signal processor, indicated generally at 20, consists of a primary data path having a first multiplication stage 22 followed by a second multiplication stage 24 and an adder stage 25. A secondary data path indicated by line 26. It must be understood that this is a highly skeletal diagram, omitting numerous registers, control functions and other architectural features for the sake of clarity in introducing inputs, outputs and arithmetic units.

Architecture 20 may also be seen as having a first data path channel indicated with broken-line box 28, which will occasionally be referred to as the in-phase or "I" channel, and a second data path channel indicated with box 30 which may be referred to as the quadrature or "Q" channel. The inputs to the processor include a first data input "A" 32, and a second data input "B" 34, as well as a first reference input "$A_{ref}$" at 36, and a second reference input "$B_{ref}$" at 38 The output of the processor architecture is shown at line 40. A reference reversing switch 39 receives the reference inputs 36 and 38 and allows them to be swapped.

The A, B and $B_{ref}$ inputs are fed to a stage 1 selection block 42. The A and B inputs also feed a stage 2 selection block 44. Again, these blocks further include multiplexers, registers and other logic which will be described in more detail with reference to FIG. 2. The architecture includes four digital multipliers and four adders divided among the two stages and the two channels. For example, I channel 28 contains a first-stage multiplier 50a followed by a first-stage adder 52a, used as the accumulator for multiplier 50a. The I channel multiplier/accumulator feeds a second-stage multiplier 54a followed by a second-stage adder 56a. Likewise, the Q channel 30 contains its own first- and second-stage multipliers 50b and 54b, respectively, followed by adders 52b and 56b. The output of adders 56 are joined at output block 58 which feeds output 40.

Basically, the inputs to the first stage multipliers 50 are selected by stage 1 select logic 42 among inputs A, B and $A_{ref}$ or $B_{ref}$, whereas the inputs to the second-stage of the architecture include the outputs of the first stage multiplier/accumulators in addition to a selection among the A, B and $A_{ref}$ or $B_{ref}$ inputs. As can be seen in FIG. 1, one input to each of the second-stage multipliers is the $A_{ref}$ or $B_{ref}$ input, while one input to each of the second stage adders 56 is derived from the A and B inputs via stage to select block 44.

Figure 2:
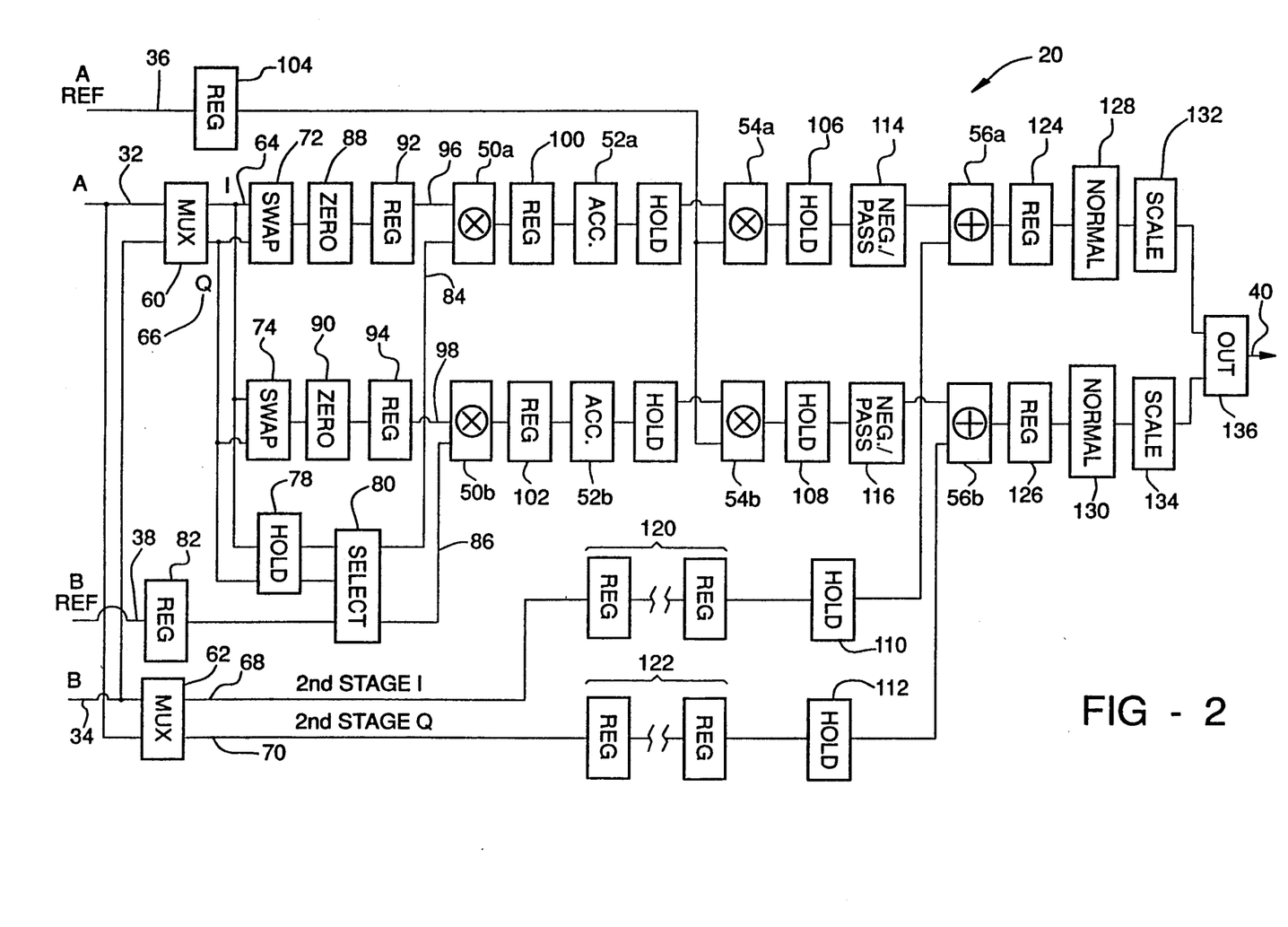
FIG. 2 is a more detailed block diagram of the arithmetic element.

Turning now to FIG. 2, the high-level introduction of FIG. 1 will be embellished with other architectural details unique to the present invention. In the preferred embodiment, A input A 32, and input B 34, are both in the form of 32-bit floating-point words, divided into two 16-bit words, each with a 4-bit offset binary exponent and a 12-bit two's complement mantissa. The reference inputs $A_{ref}$ and $B_{ref}$, 36 and 38 respectively, are each 16-bits wide, however. Relevance inputs come into the device in word serial fashion.

Inputs A and B are routed to two multiplexers 60 and 62 associated with the first stage and second stages, respectively. These multiplexers choose between inputs A and B as a single 32-bit output made up of a 16-bit I portion and a 16-bit Q portion. More specifically, the output of multiplexer 60 comprises first-stage I output 64 and first-stage Q output 66, whereas the output of multiplexer 62 comprises second-stage I output 68 and second-stage Q output 70, the latter which feed the secondary data path 26 introduced in FIG. 1.

Before discussing this secondary data path, however, the first- and second-stage I and Q channels will first be discussed in detail. Q outputs 64 and 66 from multiplexer 60 feed swap registers 72 and 74, which multiplex either the I or Q channel data into multiplier 50a or 50b.

The I and Q data also feed hold register 78, which is included in the architecture of the present invention to enable multipliers 50 to perform a complex-by-complex multiplication of inputs A and B. The output of hold register 78 feeds a select logic block 80 which chooses among I, Q and the reference 38 through register 82 as the second inputs 84 and 86, to multipliers 50.

The outputs of swap registers 72 and 74 feed zeroing logic blocks 88 and 90 which, in turn, feed registers 92 and 94, which provide the second inputs 96 and 98 to first-stage multipliers 50. The outputs of multipliers 50 enter accumulators 52 through registers 100 and 102, and the output of accumulator 52a becomes one input to second-stage multiplier 54a after passing through a hold register and the output of accumulator 52b provides one input to second-stage multiplier 54b, the other inputs to multipliers 54 being the $A_{ref}$ data 36 via register 104.

The outputs of second-stage multipliers 54 each feed a hold register, 106 and 108, respectively, which were included in conjunction with hold registers 110 and 112 in the secondary data path to permit a complex multiplication with magnitude weighting during the zero stage of a fast Fourier transformation. Since the value of the complex variable w is equal to $1+0j$ during the zero stage of Fourier transformation, the use of hold registers 106–112 frees up multipliers 54 in the second stage of the architecture, enabling a complex multiplication to be performed during the zero stage. For a detailed description of the butterfly FFT and underlying operations, see "Digital Signal Processing" by Opinheim and Schaber, Chapter 6.

The outputs of holding registers 106 and 108 feed negate/pass blocks 114 and 116, which either provide outputs either as a negation of their inputs or pass the inputs through unchanged in accordance with control signals (not shown). The output of the negate/pass blocks each form one input to second-stage adders 56, the other inputs to the adders being derived from the second stage I and Q channels in the secondary data path. Registers 120 and 122 are included to synchronize the flow of data through the secondary data path in accordance with the flow of data through the primary I and Q channels. The number of registers must match the delays in the first half of the device. The outputs of adders 56a and 56b each feed a register 124 and 126, which in turn feed normalizers 128 and 130, followed by exponent scalers 132 and 134, the outputs of which are joined in output register 136 to produce output 40.

Figure 3:
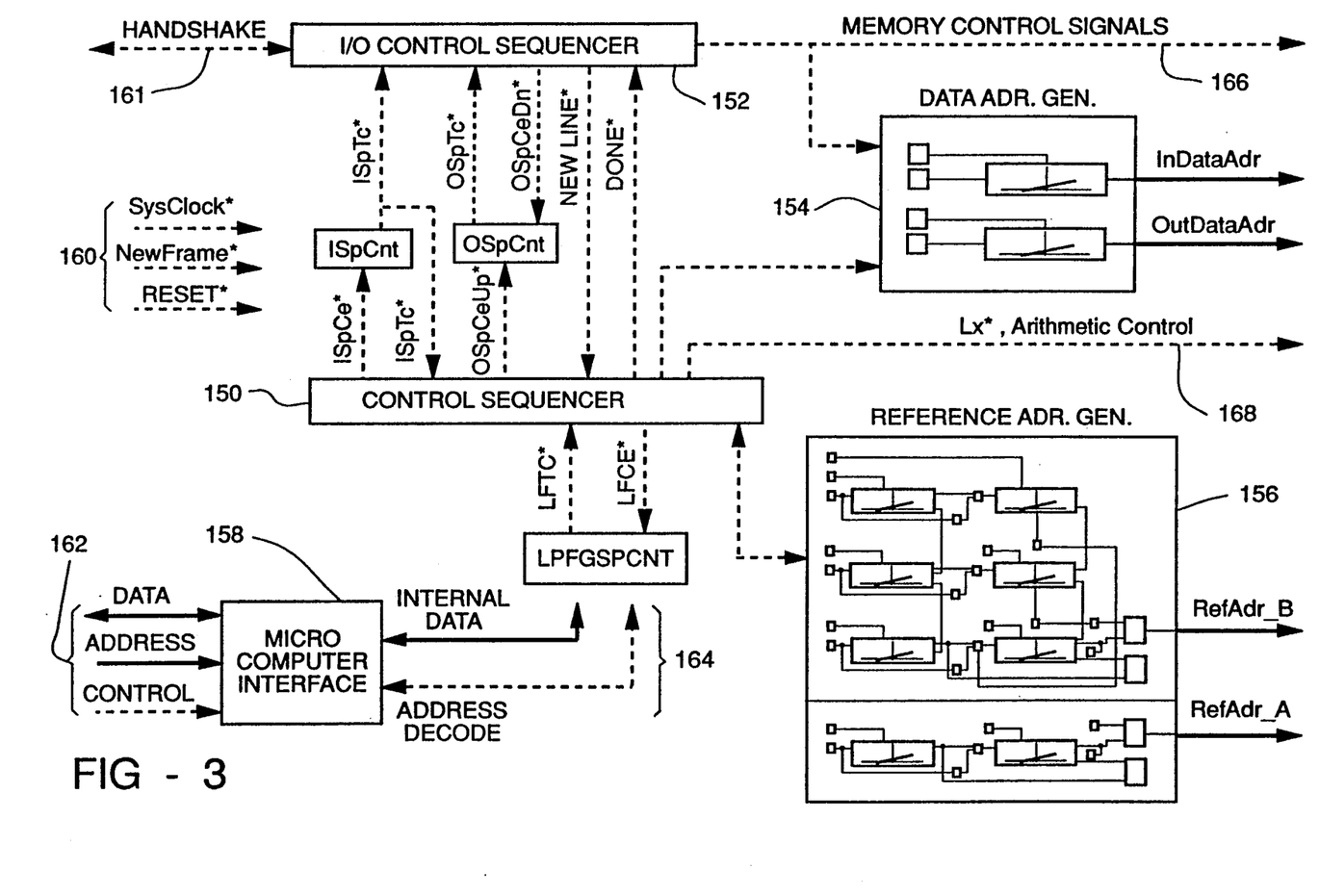
FIG. 3 is a block diagram of the control section of the present invention, showing how multiple DDAs are configured to generate data and reference addresses.

Now referencing FIG. 3, there is shown the preferred embodiment of a control section for the digital signal processor, which contains a control sequencer 150, an input/output controller 152, data address generators 154, two reference address generators 156 and related support circuitry, including a microcomputer interface 158. The central control sequencer 150 will be described in more detail with reference to FIG. 4, and the digital differential analyzers which comprise the data and reference address generators will be described in more detail with reference to FIG. 5.

The control section shown in FIG. 3 interfaces to external devices in several ways. Globally-oriented signals such as a system clock, a new frame signal and a reset signal are received along signal lines 160, and are routed to most of the functional blocks shown in the figure. Additionally, data, address and control signals are received along lines 162 and are converted into internal data and decoded address signals 164, which are also used by multiple functional units within the processor.

I/O control sequencer 152 functions as a separate state machine in interfacing with the external environment, allowing a completed numerical processor based on the present invention to operate asynchronously from the rest of the system. In addition to processing input and output hand-shaking signals, I/O controller 152 also provides memory control signals 166, and controls the input and output of data address generators 154 when data is being written to and read from the input and output buffers, respectively. Control sequencer 150 also provides multiple control signals to the arithmetic unit previously described as indicated by broken line 168.

Figure 4:
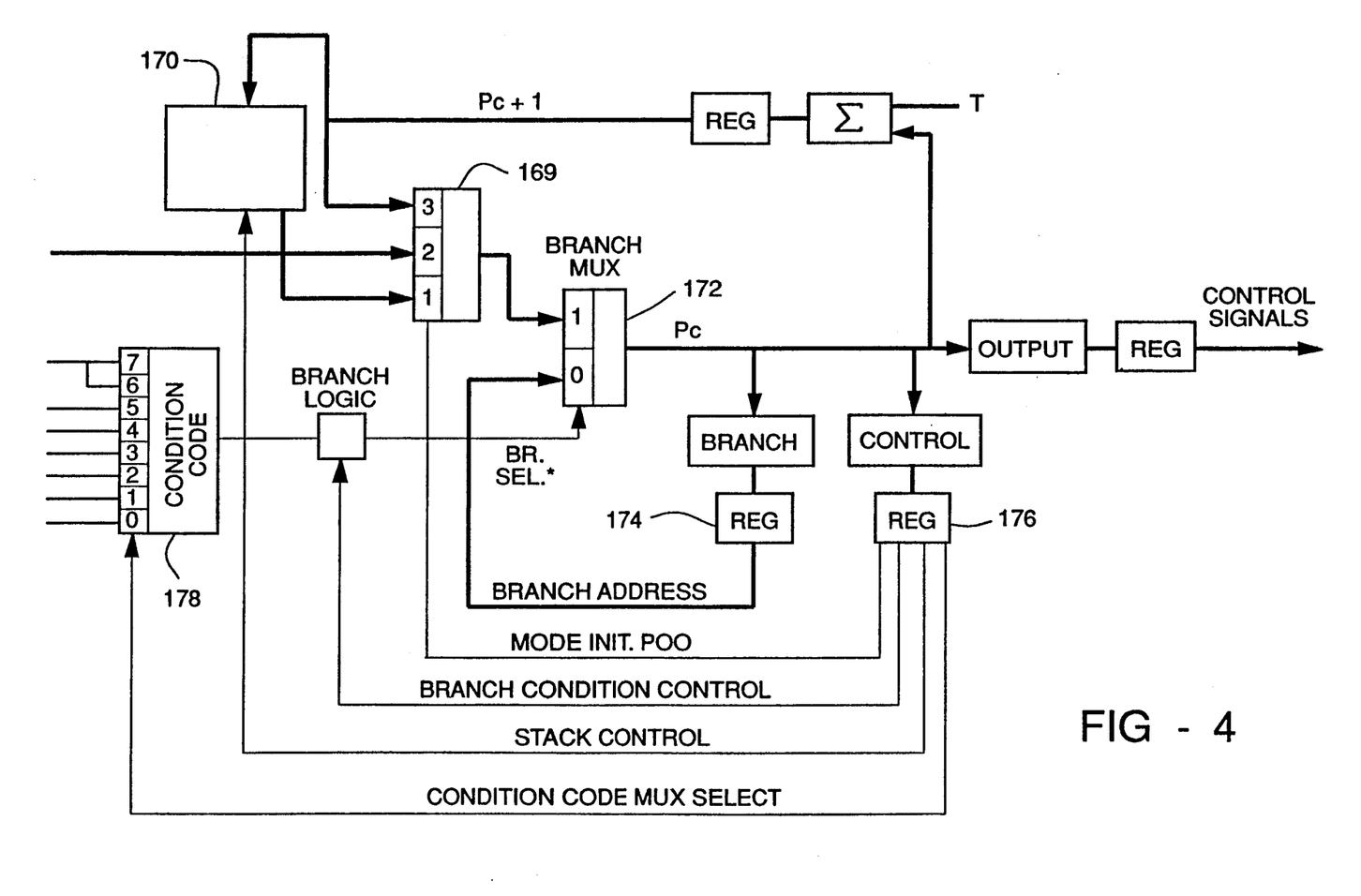
FIG. 4 is a block diagram of the control sequencer.

Turning now to FIG. 4, there is shown the control sequencer in block diagram form as indicated generally by 150. This control sequencer is microprogrammed and provides all of the control signals for the rest of the processor, including the arithmetic section. The control sequences required for each operational mode are preferably stored in a mask-programmed read-only memory (ROM). The user selects a control sequence for a given operation by setting an initial jump address which begins the operation of the selected mode. A four-deep return address stack 170 is implemented in conjunction with the control sequencer to facilitate the use of subroutines. This makes the most efficient use of the ROM storage since common control sequences can be used for multiple modes. The ROM program store contains 128 words with 64 bits per word, including 15 internal control sequencer bits, which are derived from the output of a branch multiplexer 172 and fed back to various sequencer elements via branch register 174 and control register 176. Bits from the control register, for example, are used to control branch condition, stack addressing, and control code multiplexing through condition code multiplexer 178. Some of these condition codes, such as "new line," "OSpTc" and "ISpTc" are derived from the output of I/O control sequencer 152 shown in FIG. 3; other condition codes, however, are supplied by two counters and the addresses for the input and output data buffers.

Figure 5:
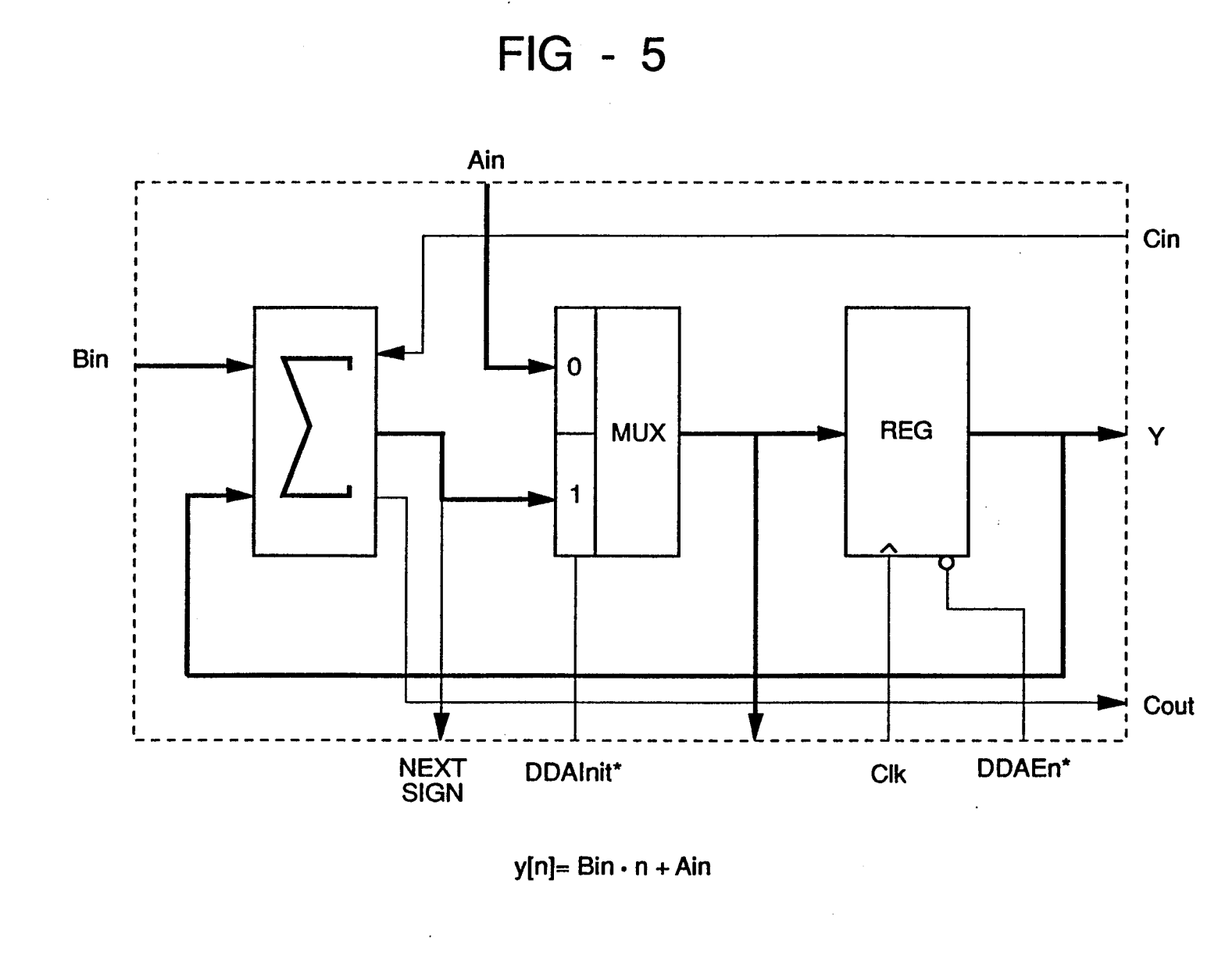
FIG. 5 is a basic linear digital differential analyzer (DDA) logic block.

FIG. 5 shows a basic linear digital differential analyzer (DDA) which is used to build the address generators in the control section. The DDAs are combined to generate the addresses used to access look-up tables as well as to create certain condition flags used by the sequencer. In addition to an input data address generator and an output data generator used to reference input and output buffers, respectively, the processor generates two independent references addresses, reference A and reference B, used by the arithmetic section as previously described.

Each reference address generator is made up of a group of the linear DDAs shown in FIG. 5. The address generator associated with $A_{ref}$ contains two DDAs in the preferred embodiment, while the address generator associated with $B_{ref}$ is more complex and contains six DDAs. These DDAs may be configured to form second order or groups of complex linear DDAs; for example, when performing azimuth polar formatting, the $B_{ref}$ reference address generator is configured as two groups of three DDAs. However, the same logic block may be configured as one second order DDA when performing fast convolution.

Figure 6:
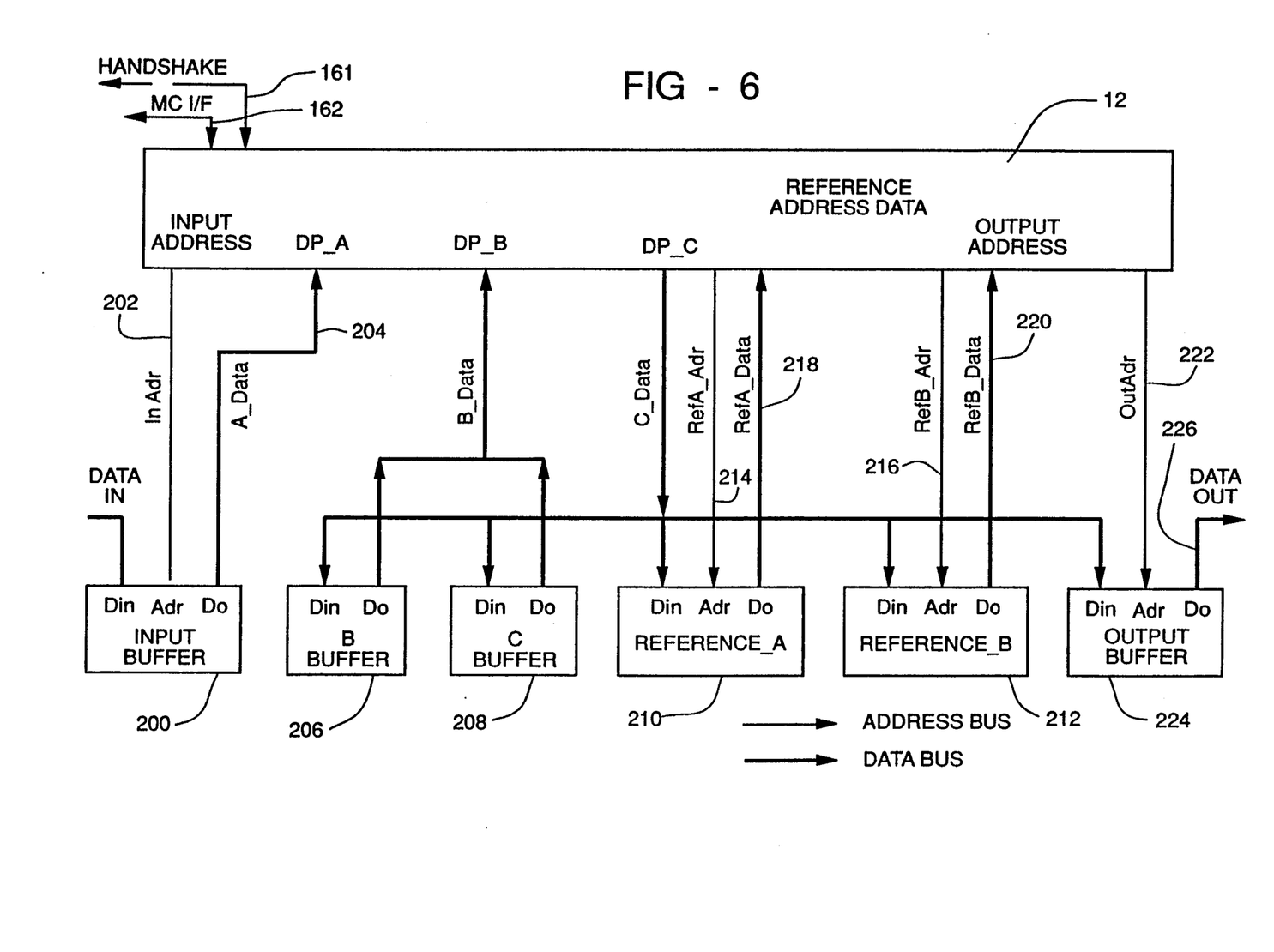
FIG. 6 is a block diagram of a complete arithmetic module utilizing the present invention.

FIG. 6 illustrates how the digital signal processor 12 is interfaced to external devices via control lines and address and data busses. As shown in the figure, the device contains all the control and addressing logic needed to implement a virtually stand-alone SAR image formation processor; the system is self contained except for external memory needed to store partial results and reference functions. With further integration, all of the memory devices illustrated in FIG. 6 could be implemented along with the processor into a single very large scale integrated device. However, the low cost of commercially available memory devices would make this approach unnecessarily expensive in most applications.

As shown in FIG. 6, handshaking and microcomputer-related signals interface to the processor via lines 161 and 162. Input data is first routed to an input buffer 200 which is addressed by one of the data address generators previously discussed with reference to the control section along address bus 202. The data bus reference enters the device along data bus 204, forming input "A" to the arithmetic unit. Two first-in, first-out buffers 206 and 208 are used to store partial "B" results and partial "C" output results, respectively. No external addressing is required, as these buffers generate their own addresses.

Two memories 210 and 212 are associated with $A_{ref}$ and $B_{ref}$ storage, respectively, and are addressed by busses 214 and 216 generated by the reference address generator in the control section. Reference A data is returned to the device along data bus 218 and reference B data along data bus 220, the two references being used in the two sections of the arithmetic unit as previously described. The control section also generates an output address in the preferred embodiment along bus 222, which references final results stored in output buffer 224, which emerge from the device along data bus 226.

Figure 7:
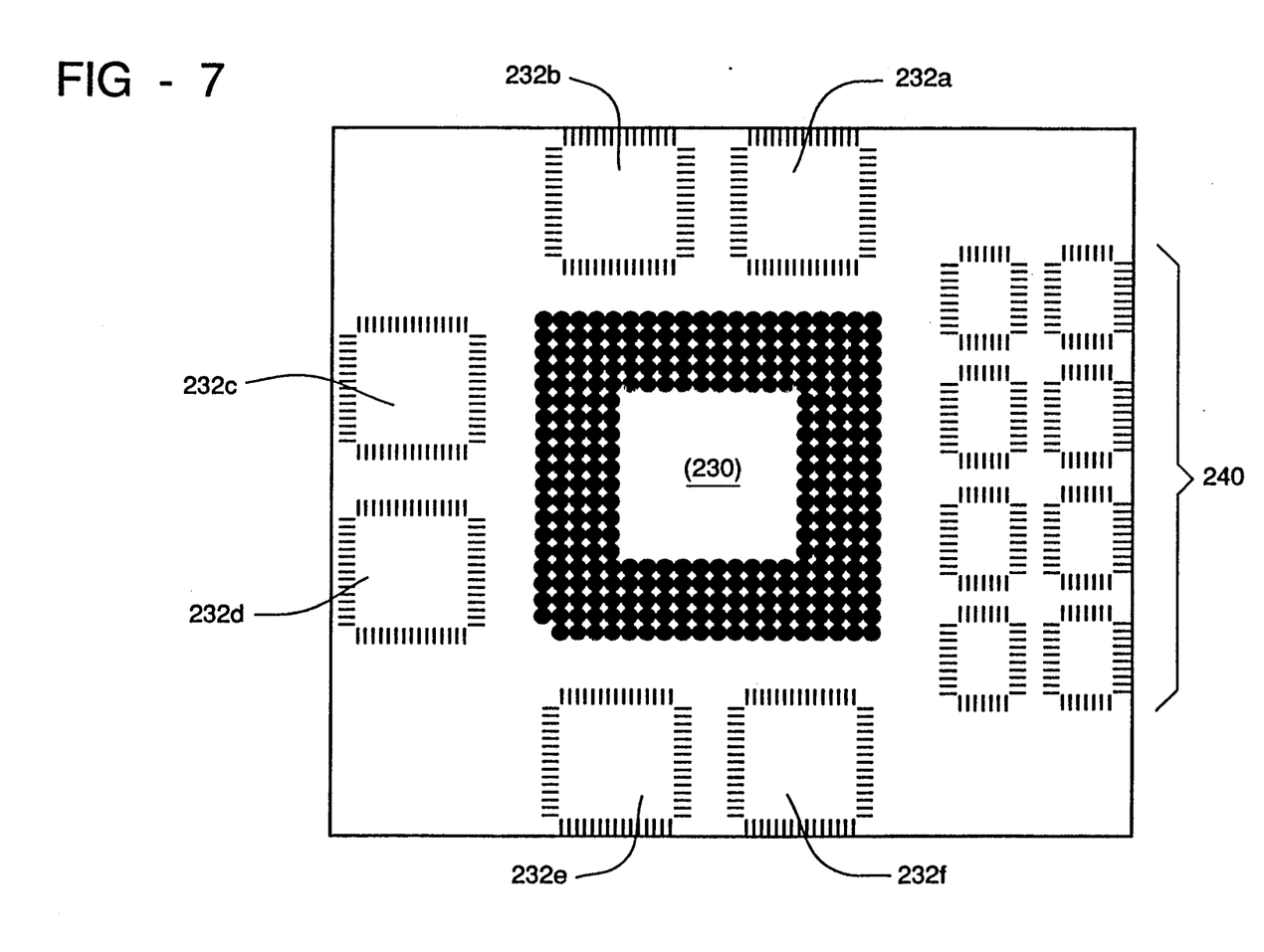
FIG. 7 is a printed-circuit board pattern of a physical implementation of the present invention used in conjunction with commercially available memory devices.

In the preferred physical implementation, the digital signal processor of the present invention is implemented as a single-chip integrated circuit, using complementary-MOS (C-MOS) processing. FIG. 7 shows the preferred layout of a printed-circuit-board, containing the single-chip implementation of the circuit in a pin-grid array situated at location 230. Around the periphery of the device are located the memory devices, including six memories 232 such as the commercially available CYC157A random access memory (RAM) supplied by Cypress Semiconductor Corporation or the equivalent, as well as eight CY7C474 FIFO$_s$ 240, also available from Cypress.

Thus, for an entire SAR image formation processor, the total number of parts, including the present invention and the commercially available memory devices as fifteen. The PCB layout of FIG. 7 assumes no special packaging, in which case the module measures approximately 4 inches on a side; if higher packaging density is desired, a multi-chip module (MCM) may be used to reduce the circuit area by greater than a factor of 4 to approximately 4 square inches. Moreover, implementing the processing section in an MCM would permit higher performance as well, by controlling the impedance of the substrate and thus allowing the circuit to be operated at higher speed.

In operation, the architecture of the present invention may be configured to perform all the primitive arithmetic operations used in classical SAR image formation processing, including FFT butterfly operations, complex and real multiplications, multiply/accumulate operations and magnitude detection. By convention, input data port A, 32 in FIGS. 1 and 2, is used to bring new data into the processor while port B, at 34, is used for partial results, typically stored in an external first-in, first-out (FIFO) memory 206 in FIG. 6. The architecture will accept either two's complement fixed or floating-point data, with an automatic fix-to-float conversion being performed in first-stage multipliers 50 shown in FIG. 2.

With two multiplication stages, the architecture can perform simultaneous computations previously not possible with a single device, such as simultaneous real and complex multiplications. This capability not only improves previously defined SAR-related image formation modes, makes new modes possible, such as simultaneous motion compensation and azimuth prefiltering, which significantly reduces weight, power and volume requirements in airborne applications.

Another example is pulse compression, which is used to enhance range resolution. With this technique, the radar transmitter sends out wide or expanded high-energy pulses, which maximize detection over long round-trip distances, but in the receiver, the pulses are narrowed or compressed to bring details out of noise. Pulse compression may be implemented with a matched filtering process which compares each return pulse with a copy of itself or a delayed version of the transmitted pulse.

In the digital domain, the pulses are phase-coded to enhance the comparison, and the comparison itself is carried out with a digital correlation or autocorrelation operation, which requires multiple shifting, complex multiplication and addition steps. For example, a complex multiplication might be performed to modify the phase, followed by a real multiplication to reduce the side-lobe components of the returned signal. The present invention solves for SAR-based matched filtering by performing complex multiplication and the requisite magnitude weighting simultaneously.

Even with the second stage of arithmetic processing, certain operations, such as fast convolution and two-dimensional polar formatting, would not be possible without the two reference inputs 36 and 38 in FIG. 2, as these operations require two unique references. Polar formatting, a focussing technique used in SAR applications, is used to compensate for the fact that detection occurs along a straight flight path while the desired phase of each return signal from a specific target lies along a circle with the target at its center. Although the FFT has no equivalent in polar coordinates, methods have been derived whereby the data may be resampled into rectangular coordinates, thus allowing an FFT to be used. The present device facilitates concurrent range and azimuth polar formatting, thus effectively reducing the necessary computing resources by a factor of two.

As mentioned, the processor is preferably implemented as a single-chip integrated circuit for both ground-based and airborne applications, where it results is considerable volume, weight, power and cost savings over the previously described prior-art devices. The use of a single device not only saves on space and weight, however, the use of a single device eliminates datapath folding that might be required with a general-purpose multiplier/accumulator circuit to ensure efficient interconnection from the die to the input/output connector on the package. With the present device, the entire datapath can be configured straight through the circuit;

that is, since the present device performs all operations from input to result, there is on need to fold the datapath so as to locate the output section near the input section as might be required with a general purpose device requiring at least two passes therethrough to finish a given computation.

More importantly, perhaps, a single device having two multiplication stages simplifies the control logic while increasing throughput. With the present device, a portion of the control section is dedicated to the first stage, and another portion to the second stage. As just one example, since the second multiplication stage may never be called upon to perform a complex multiplication, the control section dedicated to that section may be simplified accordingly. Moreover, the present invention uniquely features four distinct address generators associated with the two data and two reference addresses, the generators being built from configurable digital differential analyzers. While it might seem that to dedicate such hardware to each stage in general and to each input in particular would expand circuitry requirements due to redundancy, in actually optimizing the control sequencer to a particular function offers higher performance for a given circuit area than attempting to use a generic controller to coordinate all operations, particularly address generation.

Having thus described my invention, I claim:

1. A digital signal processor to be used in conjunction with an addressable memory device, the processor comprising:
    an arithmetic unit having first and second data inputs and first and second reference inputs, the arithmetic unit including:
    an I-channel datapath and a Q-channel datapath, each datapath including a multiplier/accumulator, a multiplier and an adder, the inputs to each multiplier/accumulator being derived from said data inputs and said first reference input, the inputs to each multiplier being derived from the output of the multiplier/accumulator for that channel and said second reference input, the inputs to each adder being derived from the output of the multiplier for that channel and said data inputs, the outputs of said adders being combined to form a result;
    a control unit including at least one address generator operative to generate an address to said memory device, enabling said memory to provide a reference or a data input to said arithmetic unit; and
    a user-programmable control sequencer connected to the address generator, the arithmetic unit and the memory, the sequencer being operative to coordinate and control the functioning of the arithmetic unit and cause the address generator to generate an address for said memory.

2. The digital signal processor of claim 1 wherein said control unit includes a plurality of address generators, at least one being associated with providing a data input to the arithmetic unit, and with at least one being associated with providing a reference input to the arithmetic unit.

3. The digital signal processor of claim 2 wherein each address generator is implemented with a digital differential analyzer.

4. The digital signal processor of claim 1 wherein said control section further includes an I/O controller connected to the control sequencer and the address generator, the I/O controller being operative to manage data, address and control signals required by, and generated by, said processor in conjunction with external devices in a system-level implementation.

5. In a digital signal processor of the type having two channels, each with a multiplier/accumulator fed by first and second data inputs and a first reference input, the improvement comprising:
    a second reference input;
    a pair of multipliers following the multiplier/accumulators, each multiplier being associated with a channel, one input to the multiplier associated with the first channel being the output of the first-channel multiplier/accumulator, one input to the multiplier associated with the second channel being the output of the second-channel multiplier/accumulator, and the other input to each multiplier being the second reference input; and
    a pair of adders following the second multipliers, each adder being associated with a channel, one input to the adder associated with the first channel being the output of the first-channel multiplier, one input to the adder associated with the second channel being the output of the second-channel multiplier, the other adder inputs being said data inputs.

6. The digital signal processor of claim 5, the improvement further comprising:
    a holding register connected between the data inputs and the multiplier/accumulators, the holding register enabling the processor to perform a complex-by-complex multiplication upon said data.

7. The digital signal processor of claim 5, the improvement further comprising:
    four holding registers, one associated with each input to each adder, the holding registers enabling the processor to perform a complex multiplication during the zero-th stage of a fast Fourier transformation.

8. The digital signal processor of claim 5, the improvement further comprising:
    at least one address generator to be used in conjunction with a memory unit; and
    a user-programmed control unit connected to said arithmetic unit and the address generator, the control unit being operative to cause said generator to derive an address for said memory unit, the data stored at that address being used as an input to the arithmetic unit.

9. A digital signal processor optimized for synthetic aperture radar image formation adapted for use in conjunction with a memory device, the processor comprising:
    a first data-input port;
    a second data-input port;
    data-select logic connected to said first and said second data input ports, said logic being operative to output the data from either port to any of a first-stage I channel, a first-stage Q channel, a second-stage I channel or a second-stage Q channel;
    a first-stage reference input port;
    reference-path logic having a first input to receive data from said first-stage reference input port, a second input to receive data from said first-stage I channel, and a third input adapted to receive data from said first-stage Q channel, said reference-path logic being operative to route any one of said inputs to either a first output or a second output;
    swapping logic having a first input to receive data from said first-stage I channel and a second input to receive data from said first-stage Q channel, said swapping logic being operative to output either of said inputs to either a first output or a second output;

a first multiplier stage having a first multiplier/accumulator and a second multiplier/accumulator, each with two inputs, the inputs to the first multiplier/accumulator being the first output of said swapping logic and the first output of said reference-path logic, the inputs to the second multiplier/accumulator being the second output of said swapping logic and the second output of said reference-path logic;

a second-stage reference input port;

a second multiplier stage having a first multiplier and a second multiplier, each with two inputs, one input to the first multiplier being the output of the first multiplier/accumulator, one input to the second multiplier being the output of the second multiplier/accumulator, and the other input to each multiplier being connected to said second-stage reference input port; and a first negate/pass circuit connected to the output of the first multiplier, and a second negate/pass circuit connected to the output of the second multiplier, each negate/pass circuit being operative to produce an output by either negating its input or by passing its input through unchanged;

a first adder and a second adder, each with two inputs, one input to the first adder being the output of the first negate/pass circuit, the other input to the first adder being the second-stage I-channel, one input to the second adder being the output of the second negate/pass circuit, the other input to the second adder being the second-stage Q-channel;

an output scaler connected to the outputs of the adders, the output scaler being operative to numerically scale its inputs and provide an output to an output data port;

a plurality of digital differential analyzers configured as data and reference address generators, the generators being operative to provide addresses to said memory device, the contents of the memory thus retrieved being used as said data and reference inputs;

an I/O controller operative to manage data, address and control signals required by, and generated by, said processor in conjunction with external devices; and a user-programmable control sequencer connected to the data-select logic, reference path logic, swapping logic, multiplier/accumulators, multipliers, negate/pass circuits, adders, output scaler, digital differential analyzers, I/O controller and memory device , the sequencer being operative to coordinate and control the overall functioning of said processor and cause said address generators to generate data and reference addresses.

10. The digital signal processor of claim 9 further including:

a holding register in said first-stage I channel and said first-stage Q channel, said register being operative to enable said processor to perform a complex-by-complex multiplication upon said input data in accordance with a control signal from said control sequencer; and a holding register in said second-stage I-channel and said second-stage Q channel and a holding register connected between the second-stage multipliers and the negate/pass circuits, the holding registers being operative to enable said processor to perform a complex multiplication during the zero-th stage of a fast Fourier transformation in accordance with a control signal from said control sequencer.

11. The digital signal processor of claim 10 wherein said processor is implemented as a single-chip integrated circuit.

12. The digital signal processor of claim 11 wherein said integrated circuit is fabricated using a C-MOS process.

* * * * *